A. T. MARSHALL.
RETARDED SOLENOID.
APPLICATION FILED MAR. 25, 1916.
1,278,189.
Patented Sept. 10, 1918.
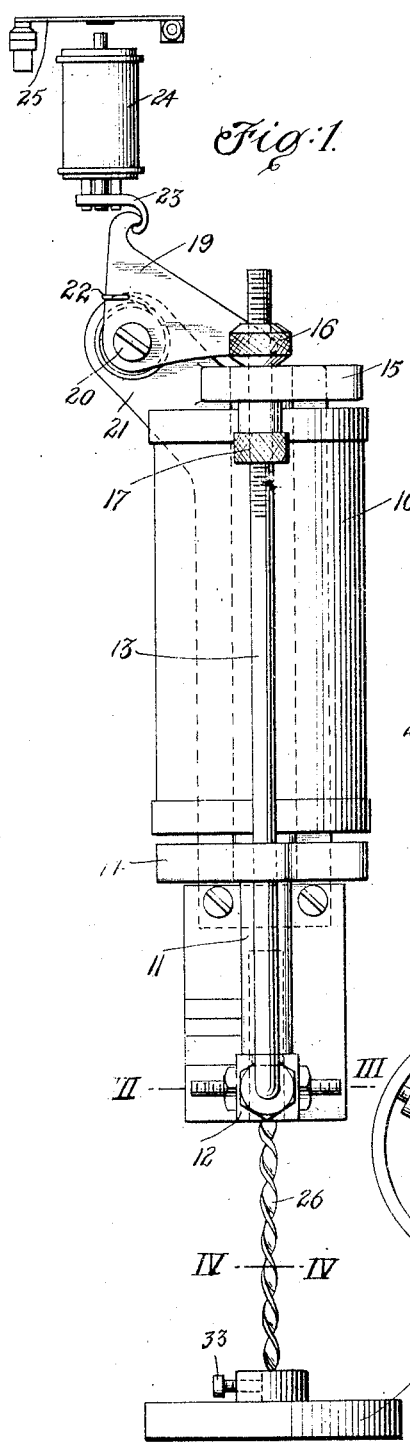
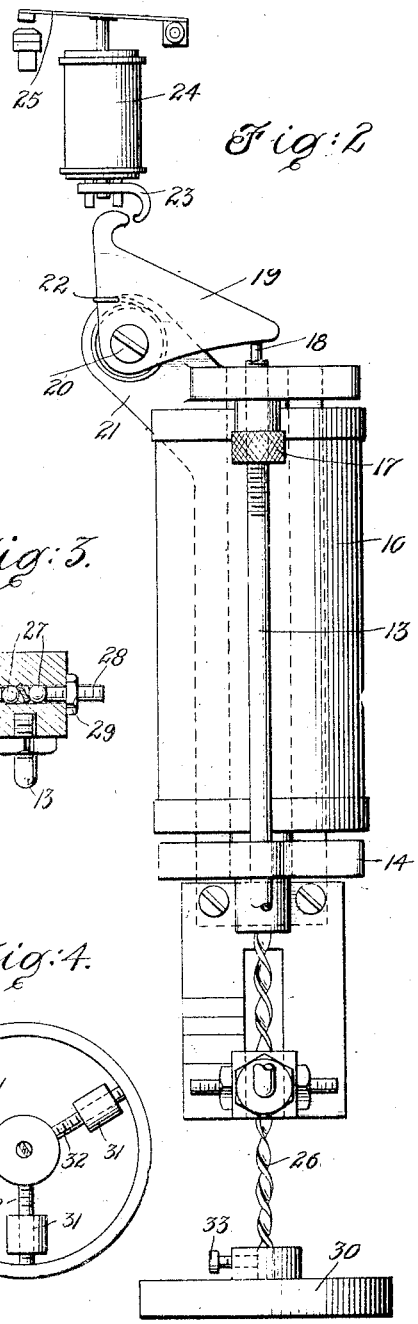
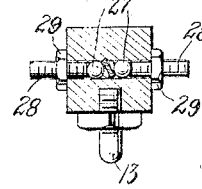
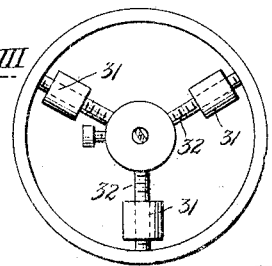
Inventor
Albert T. Marshall
By his Attorney

UNITED STATES PATENT OFFICE.

ALBERT T. MARSHALL, OF HARTFORD, CONNECTICUT, ASSIGNOR TO AUTOMATIC REFRIGERATING COMPANY, OF HARTFORD, CONNECTICUT, A CORPORATION OF CONNECTICUT.

RETARDED SOLENOID.

1,278,189.   Specification of Letters Patent.   Patented Sept. 10, 1918.

Application filed March 25, 1916. Serial No. 86,677.

*To all whom it may concern:*

Be it known that I, ALBERT T. MARSHALL, a citizen of the United States, residing in Hartford, county of Hartford, State of Connecticut, have invented certain new and useful Improvements in Retarded Solenoids, of which the following is a specification.

My invention relates in general to solenoids and analogous mechanism serving as relays or actuating means for throwing in and out electric switches and the like. In many cases it is desired to retard the progress of the moving member in the solenoid and the like, and dash pots have been suggested for accomplishing this result. Familiar examples of this purpose are to be found in many fields, as for example in automatic motor control circuits, where it is desired to open the motor circuit upon the occurrence of an overload, but to do so only after a predetermined time interval so as to avoid the unnecessary interruption of the motor circuit when the overload is of negligible duration. Such a system is illustrated for example in the U. S. patent to William E. Date, No. 1,145,569, granted July 6th, 1915. It will be understood however, that the invention is not to be regarded as applicable only to that class of apparatus, but that it may be employed in any place where for example dash pots may be employed.

The object of the invention is primarily to avoid the uncertainty of the usual dash pot operation and to provide a retarding mechanism or structure which will be uniformly reliable and permit a gradual acceleration of the movement after the initial force is applied. To this end the invention involves the provision of a weight or weights in counterbalanced relation radially distant from the axis of the moving member and the translation of a part of its movement into rotary motion whereby the inertia of weights is enabled to exercise a retarding influence. As an example of such mechanism I may refer to an Archimedean screw mounted in suitable guides to permit it to freely rotate and progress therein, with a load tending to resist sudden rotation of the screw. An embodiment of the invention is illustrated in the accompanying drawing in which, Figure 1 is a front elevation of a retarded solenoid constructed in accordance with my invention, the moving member being shown in normal position;

Fig. 2 is a similar view thereof with the moving member shown in actuated position;

Fig. 3 is a detail transverse section on the line III—III of Fig. 1, showing the guide through which the screw passes;

Fig. 4 is a transverse section taken on the line IV—IV of Fig. 1, showing the balanced load or weights carried by the screw.

Referring to said drawings, 10 indicates a solenoid having a moving core 11 normally resting upon an adjustment bracket 12 whereby the sensitiveness of the device is adjusted to suit the desired maximum load flowing through the solenoid 10. This bracket 12 is carried by a rod 13 suitably guided in blocks 14 and 15 and adjustable therein by suitable manipulation of the adjustment nuts 16, 17 threaded thereon above and below the block 15. The solenoid core 11 passes through the top of the solenoid and terminates in a reduced portion 18 which is adapted to engage for example, a hook plate 19, which is pivoted at 20 upon a bracket 21 and normally held by spring 22 in position to lock an armature 23 of a switch-closing solenoid 24, of for example, the motor switch 25. Upon occurrence of overload, the core piece 11 tends to move upward and thus release the armature 23 to permit motor switch 25 to open.

To retard the rising of solenoid core 11, a screw 26 is mounted in the bottom of core piece 11 and passes freely through a perforation in block or bracket 12, between the ball bearings 27 which are adjustably positioned or centered in accurate registry with the axis of the screw 26 by means of the adjustment screws 28 and nuts 29. The lower end of screw 26 carries a load in the form of a wheel 30 provided with weight nuts 31 adjustable on threaded spokes 32. The wheel 30 is fixedly secured to screw 26 by set screw 33 so that the load tends to resist rotary acceleration of screw 26. By adjustment of the position of weights 31 or threaded spokes 32, the magnitude of this tendency can be increased or decreased. The pitch of screw 26 may be graduated to produce any desired character of motion, but in the present instance I have shown a constant pitch to permit a gradual acceleration to occur after the motion has once commenced. In this way the device acts effectively in the initial period, but once the overload has continued long enough to initiate the motion of the core piece and rotary load, the acceleration is able to rapidly build up the desired motion to throw out the motor switch before injury to the coils can occur.

The operation of the device will be readily understood from the above description. The automatic cut-out switch 25 may be assumed normally to remain in closed position until an overload occurs, whereupon the solenoid core 11 tends to move upward. The ball bearings 27 resist direct upward movement of core 11 by their engagement with the screw 26 and thus the upward tendency of core 11 exerts a rotative force upon screw 26 which force is opposed by the inertia of load 30. For a momentary rush of current, such as occurs in starting a motor from rest, the inertia of load 30 is assumed to be sufficient to prevent the core from rising into switch-opening position. As soon as the rotation of load member 30 has actually commenced, however, the rotary acceleration permits this motion to build up rapidly and the parts are so proportioned and dimensioned as to suit the device to the particular requirements encountered.

It will of course, be understood that any production of rotary movement of an inertia load, as a retarding influence to resist acceleration, comes within the broad spirit of my invention, whether this principle be applied by rotating a screw carrying the load or by causing a fixed screw to rotate a load-carrying member, so long as relative rotary motion between the screw and its associated part occurs.

I claim:—

1. A retarded solenoid comprising in combination a core piece tending to move in axial direction, a load rotatable about the axis of said core piece and bodily movable with said core piece, and means for causing said core piece to effect rotation of said load when moved.

2. A retarded solenoid comprising in combination a core piece movable in axial direction, a load rotatable about the axis of said core piece and bodily movable with said core piece, and means for applying to said core piece, the rotary inertia of said load.

3. A retarded solenoid comprising in combination a core piece movable in axial direction, an inertia load bodily movable therewith, and means for causing a portion of the moving force of said core piece to be absorbed in overcoming the rotary inertia of said load.

4. A retarded solenoid comprising in combination a movable core piece, an inertia load movable therewith, means for adjusting the rotary movement of inertia of said load, and means for causing a portion of the moving force of said core piece to be absorbed in the rotary inertia of said load.

5. A retarded solenoid comprising in combination a movable core piece, a screw movable therewith, a load fixed to and rotatable with said screw, and means for causing said screw to rotate when moved.

6. A retarded solenoid comprising in combination a core piece movable in axial direction, a screw movable therewith, a load fixed to and rotatable with said screw about the axis of said core piece, and means for causing said screw to rotate when moved.

ALBERT T. MARSHALL.

---

It is hereby certified that in Letters Patent No. 1,278,189, granted September 10, 1918, upon the application of Albert T. Marshall, of Hartford, Connecticut, for an improvement in "Retarded Solenoids," an error appears in the printed specification requiring correction as follows: Page 2, line 68, claim 4, for the word "movement" read *moment;* and that the said Letters Patent should be read with this correction therein that the same may conform to the record of the case in the Patent Office.

Signed and sealed this 8th day of October, A. D., 1918.

[SEAL.] R. F. WHITEHEAD,

*Acting Commissioner of Patents.*

Cl. 175—341.